United States Patent [19]

Zastocki

[11] Patent Number: 4,763,620
[45] Date of Patent: Aug. 16, 1988

[54] FLUID RETENTION CUP

[75] Inventor: Ronald M. Zastocki, Old Bridge, N.J.

[73] Assignee: Brunswick Corporation, Skokie, Ill.

[21] Appl. No.: 127,889

[22] Filed: Dec. 2, 1987

[51] Int. Cl.⁴ .............................................. F01M 1/00
[52] U.S. Cl. ............................. 123/196 A; 123/198 R; 184/88.2
[58] Field of Search ......................... 123/196 R, 196 A; 141/88, 65, 1; 184/88 R, 109

[56] References Cited

U.S. PATENT DOCUMENTS

| 4,329,231 | 5/1982 | Hoffman et al. | 123/196 A |
| 4,603,244 | 7/1986 | Genz | 123/196 A |
| 4,676,281 | 6/1987 | Nord | 141/1 |

Primary Examiner—E. Rollins Cross
Attorney, Agent, or Firm—Andrus, Sceales, Starke & Sawall

[57] ABSTRACT

For an internal combustion engine (2, 64) having a fluid filter (6, 60), a fluid retention cup (22, 50) is disposed around the filter and extends beneath the interface (12, 62) of the filter and the engine to catch fluid spills when the filter is loosened and removed from the engine. The cup has a filter-engaging portion (36–40, 58) engaging the filter and holding an retaining the filter after removal of the filter from the engine, a lip portion (32, 56) proximate and spaced from the interface of the filter and engine, and a reservoir portion (45, 54) communicating with the lip portion and collecting spilled fluid.

15 Claims, 2 Drawing Sheets

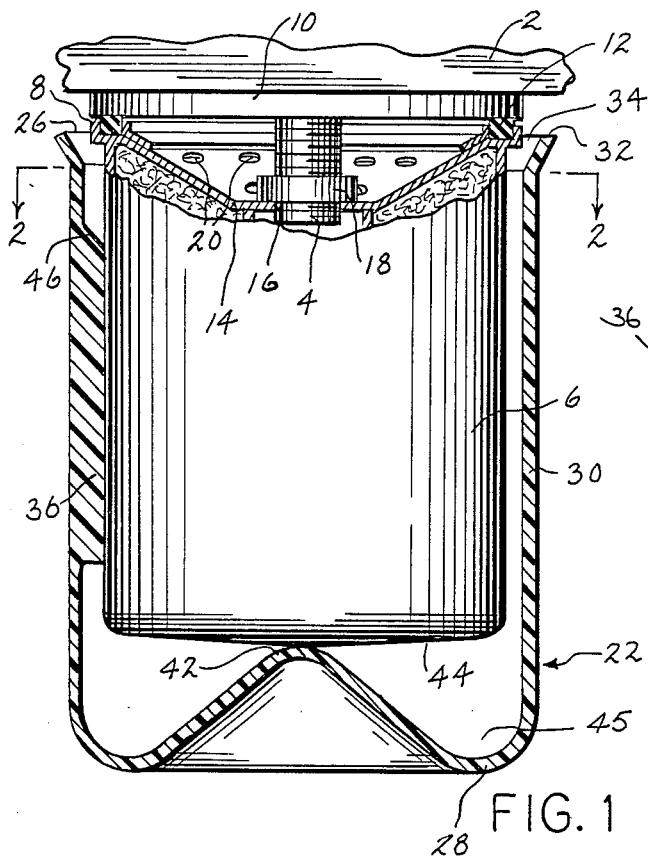
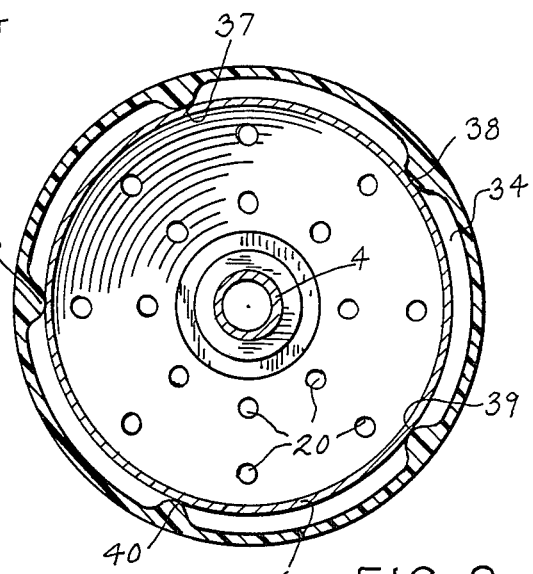
FIG. 2
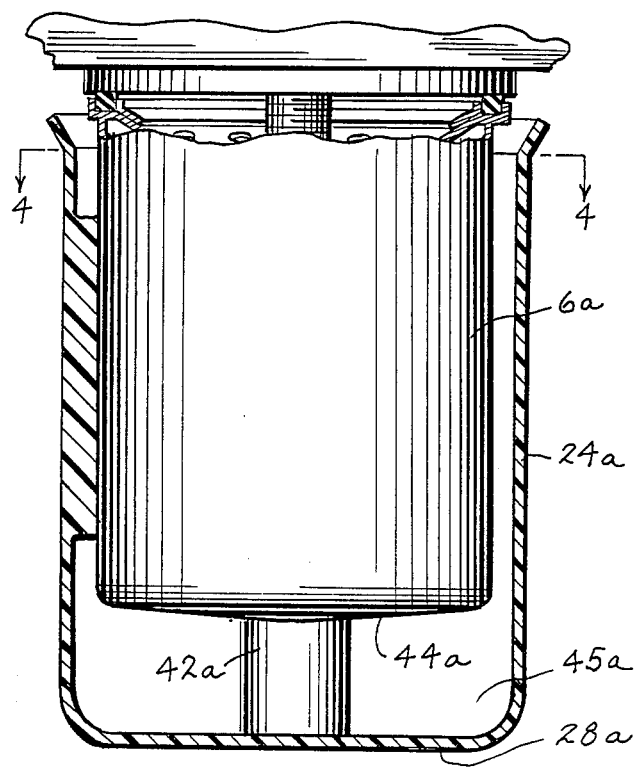
FIG. 3
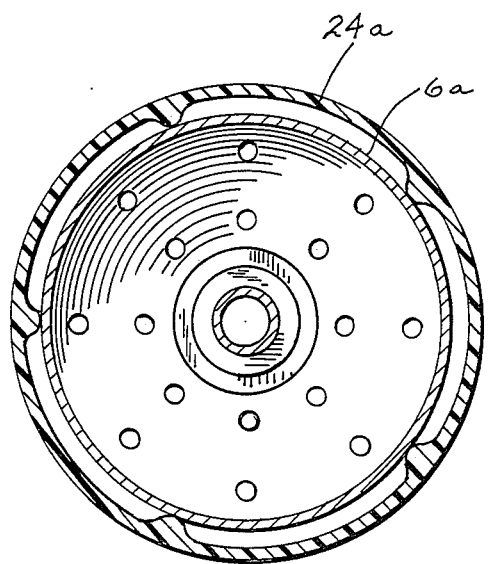
FIG. 4

FLUID RETENTION CUP

BACKGROUND AND SUMMARY

The invention relates to fluid filters, including oil filters, gasoline filters and water separating fuel filters for internal combustion engines. The invention provides a fluid retention cup cooperating with the filter to catch fluid spills during loosening and removal of the filter from the engine.

An internal combustion engine has a threaded stud to which an oil filter is mounted. The filter has an end facing the engine and sealed thereto by an outer circumferential gasket concentric to the stud. When changing engine oil and replacing the filter, the filter is unscrewed from the stud. During loosening and removal of the filter, oil typically spills from around the gasket. This oil spill may run down the side of the filter, the hand of the user, the filter wrench, or down the side the engine block, requiring cleanup.

The present invention provides a simple yet effective retention cup for catching oil spills from around the filter gasket. The invention has application to various fluid filters of the engine.

BRIEF DESCRIPTION OF THE DRAWINGS

FIG. 1 is a side view partially in section of an oil retention cup in accordance with the invention.

FIG. 2 is a sectional view taken along line 2—2 of FIG. 1.

FIG. 3 is a side view partially in section of an alternate embodiment of an oil retention cup in accordance with the invention.

FIG. 4 is a sectional view taken along line 4—4 of FIG. 3.

DETAILED DESCRIPTION

Figure 5:
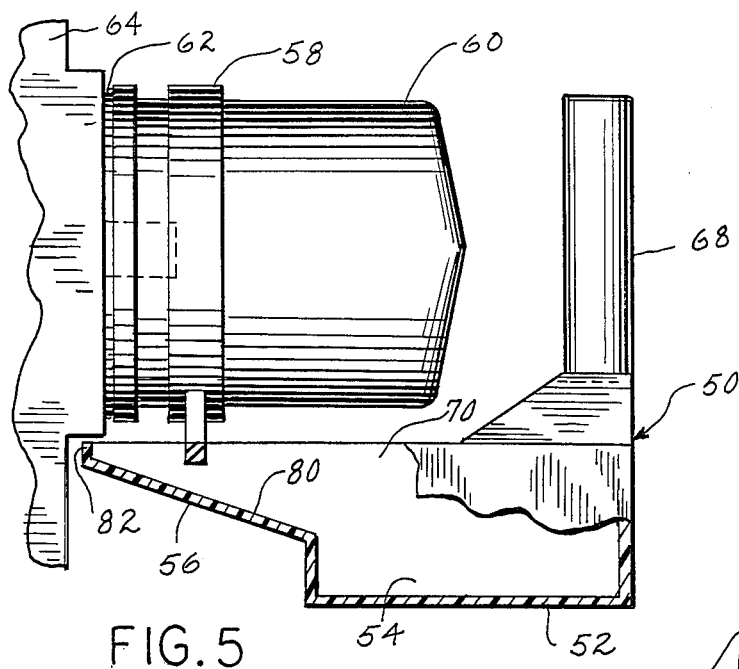
FIG. 5 is a side view partially in section of another alternate embodiment of an oil retention cup in accordance with the invention.

FIG. 1 shows a portion of the engine block 2 of an internal combustion engine having a threaded stud 4 to which an oil filter 6 is mounted. Filter 6 is conventional, and has a top end 8 facing annular seating disk 10 of the engine and sealed thereto by an outer circumferential gasket 12 concentric to stud 14. Filter 6 has a top recessed plate 14 with an aperture 16 through which stud 4 extends. The central portion of plate 14 is of increased thickness and is internally threaded to receive stud 4, or an internally threaded separate member 18 is affixed to the top or bottom side of the central portion of plate 14 for receiving the stud. Stud 4 is hollow, and engine oil is circulated through the stud into the filter, and the oil then flows through return holes 20 in plate 14 back to the engine, all as is well known.

An oil retention cup 22 is provided by a cylindrical canister 24 having an open top end 26, a closed bottom end 28, and a cylindrical side wall 30 therebetween. Canister 24 is slid axially upwardly onto and around filter 6. Open top end 26 of the canister has an outer circumferential edge 32 forming a lip concentric to gasket 12 and spaced radially outwardly from the filter to form an annular gap 34 therebetween. Cylindrical side wall 30 of the canister has a plurality of inner filter-gripping portions 36, 37, 38, 39, 40 gripping filter 6 such that filter 6 may be removed from stud 4 by gripping the outer surface of canister 24 such that inner filter-gripping portions 36-40 grip filter 6, and then turning canister 24 such that canister 24 and filter 6 turn together. Filter 6 is initially pre-loosened on stud 4 by a standard filter wrench to enable turning by hand, whereafter canister 24 is slid onto the filter and gripped and turned by hand to continue loosening filter 6 from stud 4 and remove the filter from the stud. During loosening and removal of the filter, oil spilling from around gasket 12 falls into canister 24 through annular gap 34. After removal, filter 6 is retained in canister 24. Both the canister and the filter can be disposed of, or the filter can be removed from the canister, and the canister retained for further use.

The bottom 28 of the canister has a central raised portion 42 limiting the axial depth of insertion of filter 6 into canister 24 as the canister is slid onto the filter. This spaces the bottom end 44 of the filter from the bottom 28 of the canister, to provide a reservoir 45 at the bottom of the canister for collecting the spilled oil. FIG. 3 shows a further embodiment of the canister of FIG. 1 and uses like reference numerals with the postscript "a" where appropriate to facilitate clarity. A separate spacer element 42a is provided at the bottom 28a of canister 24a to space the bottom 44a of filter 6a above the bottom of the canister, to provide a reservoir 45a at the bottom of the canister for collecting the spilled oil.

Referring to FIGS. 1 and 2, filter-gripping portions 36-40 of the canister are formed by inner radial projections extending from cylindrical side wall 30 radially inwardly to engage filter 6 and grip the latter for removal from stud 4. Projections 36-40 also serve to space cylindrical side wall 30 of the canister from filter 6 to provide the noted annular gap 34, such that spilled oil flows downwardly through such annular gap and between projections 36-40. Canister 24 is preferably a semiflexible plastic member sized to provide a slight interference fit on filter 6 as the latter is engaged by the inner tips of projections 36-40. The projections are tapered at their upper ends, as shown at 46, to facilitate axial sliding of the canister onto the filter. Outer circumferential edge 32 of the canister is flared radially outwardly and has a greater diameter than cylindrical side wall 30 of the canister. Lip edge 32 is substantially radially coplanar with gasket 12.

FIG. 5 shows an alternate embodiment of an oil retention cup 50 formed by a relatively rigid plastic tray 52 having a lower collection chamber 54, a forward lip 56 extending from the collection chamber, and an upper cylindrical band 58 slid axially onto and around filter 60 such that the forward lip 56 of the tray extends beneath the gasket 62 at the interface between the engine block 64 and filter 60. Oil retention cup 50 is better suited to an internal combustion engine with a horizontal stud, shown in dashed line at 66; whereas oil retention cup 22 of FIG. 1 is better suited to a vertical stud 4.

Band 58 loosely engages filter 60 such that the filter can be turned to loosen and remove the filter from stud 66 without turning tray 52, whereby the tray remains in place while the filter is loosened. During turning of the filter, tray 52 is supported on the filter by band 58, with collection chamber 54 beneath the filter and depending from band 58. Oil spilling from around gasket 62 falls into collection chamber 54 as guided by lip 56. After removal of filter 60 from stud 66, the filter is held and retained on the tray by band 58. Filter 60 is then slid axially out of band 58 and disposed of. The oil in collection chamber 54 is disposed of by pouring same out lip 56.

A handle 68 is integrally formed with the plastic tray at the rear end, opposite lip 56. Handle 68 extends upwardly from collection chamber 54 and is axially spaced rearwardly from filter 60 by a distance sufficient to allow filter 60 to be turned and axially moved out of threaded connection with stud 66.

Figure 6:
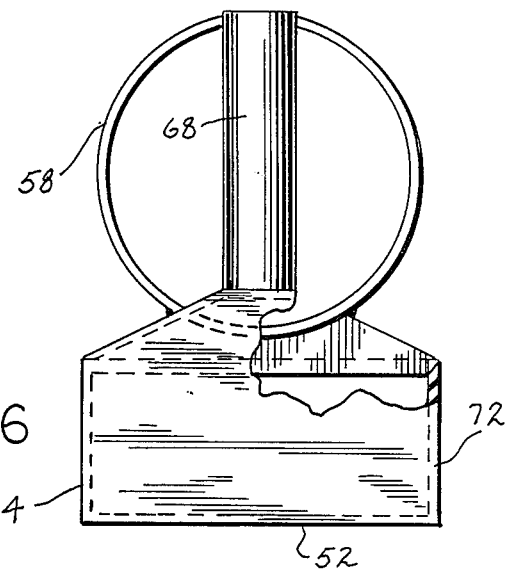
FIG. 6 is an end view of the oil retention cup of FIG. 5.
Figure 7:
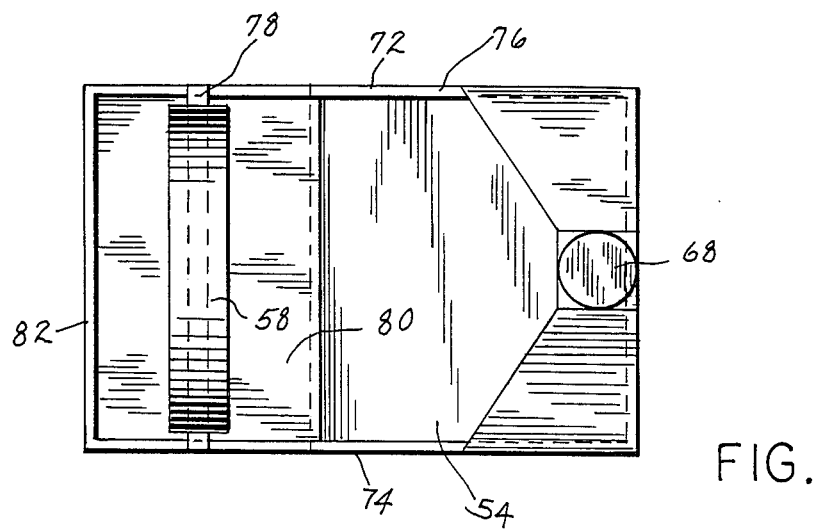
FIG. 7 is a top view of the oil retention cup of FIG. 5.

Lip 56 and collection chamber 54 are formed by a receptacle 70 having side walls 72 and 74, FIGS. 6 and 7, and an open top 76. Band 58 is attached to the receptacle by a bridge member 78 spanning and sonically welded to side walls 72 and 74 at open top 76. Band 58 is attached to bridge member 78 by sonic welding. Lip 56 includes a sloped ramp portion 80 extending from collection chamber 54 forwardly beneath bridge member 78 and gasket 62 to a forward edge 82 beyond the gasket.

It is recognized that various equivalents, alternatives and modifications are possible within the scope of the appended claims.

I claim:

1. For an internal combustion engine having a fluid filter, a fluid retention cup disposed around said filter and extending beneath the interface of said filter and said engine to catch fluid spills when said filter is loosened and removed from said engine.

2. The invention according to claim 1 wherein said cup comprises a filter-engaging portion engaging said filter and holding and retaining said filter after removal of said filter from engine, a lip portion extending proximate said interface of said filter and said engine to catch said fluid spills, and a reservoir portion communicating with said lip portion and collecting said spilled fluid.

3. For an internal combustion engine having a threaded stud to which a fluid filter is mounted, said filter having an end facing said engine and sealed thereto by a circumferential gasket concentric to said stud, a fluid retention cup comprising a canister having an open top end, a closed bottom end and a cylindrical side wall therebetween, said canister being slid axially onto an around said filter, said open end of said filter having an outer circumferential edge forming a lip concentric to said gasket and spaced radially outwardly from said filter to form an annular gap therebetween, said cylindrical side wall of said canister having inner filter-gripping portions gripping said filter such that said filter may be removed from said stud by gripping the outer surface of said canister such that said inner filter-gripping portions grip said filter and by turning said canister such that said canister and said filter turn together, and such that fluid spilling from around said gasket falls into said canister through said annular gap.

4. The invention according to claim 3 comprising spacer means limiting the axial depth of insertion of said filter into said canister as said canister is slid onto said filter, to space the bottom of said filter from the bottom of said canister and provide a reservoir at the bottom of said canister for collecting said spilled fluid.

5. The invention according to claim 3 wherein said inner filter-gripping portions of said canister comprise a plurality of inner radial projections extending from said cylindrical side wall radially inwardly to engage said filter to grip the latter for removal from said stud and also to space said cylindrical side wall from said filter to provide said annular gap such that spilled fluid falls downwardly through said annular gap and between said inner radial projections.

6. The invention according to claim 5 wherein said outer circumferential edge of said open end of said canister forming said lip is flared radially outwardly and has a greater diameter than said cylindrical side wall of said canister, and wherein said lip is substantially radially coplanar with said gasket.

7. The invention according to claim 3 wherein said filter is initially loosened on said stud by a filter wrench to enable turning by hand, whereafter said canister is slid onto said filter and gripped and turned by hand to remove said filter from said stud.

8. The invention according to claim 7 wherein said filter is retained in said canister after removal from said stud.

9. For an internal combustion engine having a threaded stud to which a fluid filter is mounted, said filter having an end facing said engine and sealed thereby by a circumferential gasket concentric to said stud, a fluid retention cup comprising a tray having a lower collection chamber, a forward lip extending from said collection chamber, and an upper cylindrical band slid axially onto and around said filter such that said forward lip of said tray extends beneath said gasket, said band loosely engaging said filter such that said filter can be turned to loosen and remove said filter from said stud without turning said tray, whereby said tray remains in place during turning of said filter, and such that during turning of said filter said tray is supported on said filter by said band, with said collection chamber beneath said filter and depending from said band, such that fluid spilling from around said gasket falls into said collection chamber as guided by said lip.

10. The invention according to claim 9 comprising a handle on said tray at the end opposite said lip.

11. The invention according to claim 10 wherein said handle extends upwardly from said collection chamber and is axially spaced from said filter by a distance sufficient to allow said filter to be turned and axially moved out of threaded connection with said stud.

12. The invention according to claim 9 wherein said lip and said collection chamber are formed by a receptacle having side walls and an open top, and wherein said band is attached to said receptacle.

13. The invention according to claim 12 wherein said receptacle comprises a bridge member spanning said side walls at said open top, and wherein said band is attached to said bridge member.

14. The invention according to claim 9 wherein said lip comprises a sloped ramp extending from said collection chamber forwardly beneath said gasket to a forward edge beyond said gasket.

15. The invention according to claim 9 wherein said filter is held and retained on said tray by said band after removal of said filter from said stud.

* * * * *